United States Patent
Woods

(10) Patent No.: US 8,631,508 B2
(45) Date of Patent: Jan. 14, 2014

(54) MANAGING LICENSES OF MEDIA FILES ON PLAYBACK DEVICES

(75) Inventor: Thomas Steven Woods, Arlington Heights, IL (US)

(73) Assignee: Rovi Technologies Corporation, Santa Clara, CA (US)

( * ) Notice: Subject to any disclaimer, the term of this patent is extended or adjusted under 35 U.S.C. 154(b) by 204 days.

(21) Appl. No.: 12/820,812

(22) Filed: Jun. 22, 2010

(65) Prior Publication Data

US 2011/0314554 A1    Dec. 22, 2011

(51) Int. Cl.
G06F 7/04      (2006.01)
G06F 17/30     (2006.01)
H04N 7/16      (2011.01)

(52) U.S. Cl.
USPC .......................................................... 726/31

(58) Field of Classification Search
USPC ...................................... 726/26, 31
See application file for complete search history.

(56) References Cited

U.S. PATENT DOCUMENTS

| | | |
|---|---|---|
| 6,177,931 B1 | 1/2001 | Alexander et al. |
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward, III et al. |
| 7,165,098 B1 | 1/2007 | Boyer et al. |
| 7,660,416 B1 | 2/2010 | Kline |
| 7,761,892 B2 | 7/2010 | Ellis et al. |
| 7,774,819 B2 | 8/2010 | Perez |
| 7,778,980 B2 | 8/2010 | Bodin et al. |
| 7,801,847 B2 | 9/2010 | Kiilerich et al. |
| 7,822,644 B2 | 10/2010 | Alberth et al. |
| 7,996,754 B2 | 8/2011 | Bodin et al. |
| 8,046,801 B2 | 10/2011 | Ellis et al. |
| 8,346,867 B2 | 1/2013 | Sharkey |

(Continued)

FOREIGN PATENT DOCUMENTS

| | | |
|---|---|---|
| EP | 1069491 A2 | 1/2001 |
| EP | 1081574 A1 | 3/2001 |

(Continued)

OTHER PUBLICATIONS

"International Application Application Serial No. PCT/US2010/051448, International Preliminary Report on Patentability mailed May 31, 2012", 7 pgs.

(Continued)

*Primary Examiner* — Kambiz Zand
*Assistant Examiner* — Benjamin Kaplan
(74) *Attorney, Agent, or Firm* — Ropes & Gray LLP

(57) ABSTRACT

Embodiments are described herein for managing licenses of media files on playback devices in a media system. In some embodiments, each media file is purchased based on a number of licenses, each license granting permission to store the media file on a single playback device. Each media file may have an associated number of one or more licenses that specifies the maximum number of playback devices on which the media file may be stored at the same time (concurrently). The media system may comprise a home central licensing (HCL) device, a primary storage device, and playback devices coupled via a network. The primary storage device may be used to initially store newly purchased media files. The HCL device may allow or prohibit distribution of the media files on the primary storage device to playback devices by using a license manager data structure storing licensing information for each media file.

20 Claims, 11 Drawing Sheets

(56) References Cited

U.S. PATENT DOCUMENTS

| | | | |
|---|---|---|---|
| 2002/0099695 A1 | 7/2002 | Abajian et al. | |
| 2002/0174428 A1 | 11/2002 | Agnihotri et al. | |
| 2002/0174430 A1 | 11/2002 | Ellis et al. | |
| 2003/0110499 A1 | 6/2003 | Knudson et al. | |
| 2003/0141987 A1 | 7/2003 | Hayes | |
| 2004/0034650 A1 | 2/2004 | Springer et al. | |
| 2004/0073920 A1 | 4/2004 | Yuen et al. | |
| 2004/0220926 A1 | 11/2004 | Lamkin et al. | |
| 2005/0060266 A1* | 3/2005 | DeMello et al. | 705/57 |
| 2005/0091169 A1* | 4/2005 | Peinado et al. | 705/59 |
| 2005/0108320 A1 | 5/2005 | Lord et al. | |
| 2005/0114896 A1* | 5/2005 | Hug et al. | 725/88 |
| 2005/0138576 A1 | 6/2005 | Baumert et al. | |
| 2005/0210135 A1 | 9/2005 | Abrahams et al. | |
| 2005/0251827 A1 | 11/2005 | Ellis et al. | |
| 2006/0107330 A1* | 5/2006 | Ben-Yaacov et al. | 726/26 |
| 2006/0161538 A1 | 7/2006 | Kiilerich | |
| 2006/0195513 A1 | 8/2006 | Rogers et al. | |
| 2007/0073704 A1 | 3/2007 | Bowden et al. | |
| 2007/0078993 A1 | 4/2007 | Issa | |
| 2007/0083915 A1 | 4/2007 | Janakiraman et al. | |
| 2007/0156726 A1 | 7/2007 | Levy | |
| 2007/0192684 A1 | 8/2007 | Bodin et al. | |
| 2007/0220024 A1 | 9/2007 | Putterman et al. | |
| 2007/0226238 A1 | 9/2007 | Kiilerich et al. | |
| 2007/0239611 A1 | 10/2007 | Blum | |
| 2007/0276866 A1 | 11/2007 | Bodin et al. | |
| 2008/0103977 A1* | 5/2008 | Khosravy et al. | 705/59 |
| 2008/0109366 A1* | 5/2008 | Read | 705/58 |
| 2008/0109368 A1* | 5/2008 | Read et al. | 705/59 |
| 2008/0113787 A1 | 5/2008 | Alderucci et al. | |
| 2008/0134043 A1 | 6/2008 | Georgis et al. | |
| 2008/0140433 A1* | 6/2008 | Levy et al. | 705/1 |
| 2008/0147650 A1 | 6/2008 | Marsh | |
| 2008/0195871 A1* | 8/2008 | Peinado et al. | 713/189 |
| 2008/0276279 A1 | 11/2008 | Gossweiler et al. | |
| 2009/0019364 A1 | 1/2009 | Cho et al. | |
| 2009/0049074 A1 | 2/2009 | Dara-Abrams et al. | |
| 2009/0187657 A1 | 7/2009 | Uemitsu | |
| 2009/0201896 A1 | 8/2009 | Davis et al. | |
| 2009/0271826 A1 | 10/2009 | Lee et al. | |
| 2010/0071005 A1 | 3/2010 | Kusunoki | |
| 2010/0121941 A1 | 5/2010 | Harrang et al. | |
| 2010/0153885 A1 | 6/2010 | Yates | |
| 2010/0185765 A1 | 7/2010 | Kang et al. | |
| 2010/0251305 A1 | 9/2010 | Kimble et al. | |
| 2010/0293058 A1* | 11/2010 | Maher et al. | 705/14.66 |
| 2010/0299522 A1* | 11/2010 | Khambete | 713/168 |
| 2011/0069940 A1 | 3/2011 | Shimy et al. | |
| 2011/0083073 A1 | 4/2011 | Atkins et al. | |
| 2011/0125585 A1 | 5/2011 | Dow et al. | |
| 2011/0125753 A1 | 5/2011 | Dow et al. | |
| 2011/0125774 A1 | 5/2011 | Dow et al. | |
| 2011/0125809 A1 | 5/2011 | Woods et al. | |
| 2011/0126104 A1 | 5/2011 | Woods et al. | |
| 2011/0126230 A1 | 5/2011 | Dow et al. | |
| 2011/0264743 A1 | 10/2011 | Baumert et al. | |
| 2013/0174223 A1 | 7/2013 | Dykeman et al. | |
| 2013/0174273 A1 | 7/2013 | Grab et al. | |

FOREIGN PATENT DOCUMENTS

| | | |
|---|---|---|
| EP | 1162810 | 12/2001 |
| WO | WO 00/23926 | 4/2000 |
| WO | WO 00/56066 | 9/2000 |
| WO | WO 00/58895 | 10/2000 |
| WO | WO 01/53994 | 7/2001 |
| WO | WO 01/67317 | 9/2001 |
| WO | WO 03/042866 | 5/2003 |
| WO | WO-2004044821 A1 | 5/2004 |
| WO | WO 2005/015429 | 2/2005 |
| WO | WO 2011/062688 | 5/2011 |
| WO | WO 2011/062689 | 5/2011 |
| WO | WO 2011/062690 | 5/2011 |
| WO | WO 2011/062691 | 5/2011 |
| WO | WO-2011163177 A3 | 12/2011 |

OTHER PUBLICATIONS

"International Application Serial No. PCT/US2010/051448, Search Report mailed Feb. 11, 2011", 5 pgs.

"International Application Serial No. No. PCT/US2010/051448, Written Opinion mailed Feb. 11, 2011", 5 pgs.

"International Application Serial No. PCT/US2010/051493, Preliminary Report on Patentability mailed May 31, 2012", 16 pgs.

"International Application Serial No. PCT/US2010/051493, Search Report mailed Dec. 23, 2010", 5 pgs.

"International Application Serial No. PCT/US2010/051493, Written Opinion mailed Dec. 23, 2010", 5 pgs.

"International Application Serial No. PCT/US2010/051506, Search Report mailed Feb. 10, 2011", 5 pgs.

"International Application Serial No. PCT/US2010/051506, Written Opinion mailed Feb. 10, 2011", 5 pgs.

"International Application Serial No. PCT/US2010/051511, Search Report mailed Jan. 24, 2011", 5 pgs.

"International Application Serial No. PCT/US2010/051511, Written Opinion mailed Jan. 24, 2011", 5 pgs.

"Spyglass Prism", Spyglass Prism. Concepts and Applications, XP002907213,(Jan. 1, 1997), 8 pgs.

Ma, W. Y., et al., "Framework for adaptive content delivery in heterogeneous network environments", XP002168331, [Online]. Retrieved from the Internet: <URL: http://www.cooltown.hp.com/papers/adcon/MMCN2000>, (Jan. 24, 2000).

* cited by examiner

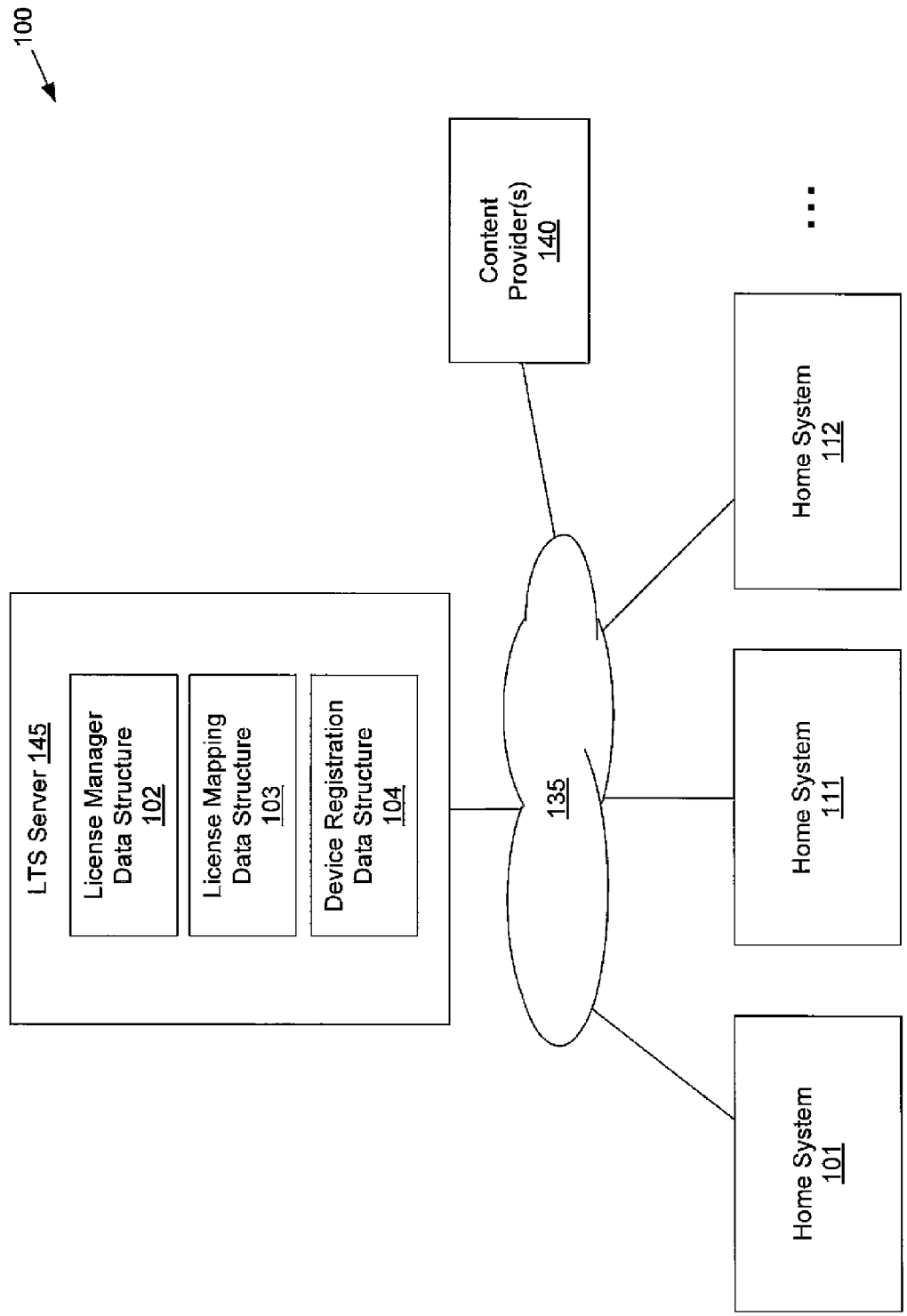

| Media File ID | Address Pointer | Number of Licenses | Number of Devices Stored On | Stored Device Identifiers |
|---|---|---|---|---|
| MediaFile1 | P1 | 3 | 0 | |
| MediaFile2 | P3 | 1 | 0 | |
| MediaFile3 | P2 | 4 | 0 | |
| ... | | | | |

FIG. 4

| Media File Version ID | Number of Licenses |
|---|---|
| MediaFile1Version1 | 1 |
| MediaFile1Version2 | 2 |
| MediaFile1Version3 | 3 |
| ⋮ | ⋮ |
| MediaFile2Version1 | 1 |
| MediaFile2Version2 | 2 |
| MediaFile2Version3 | 3 |
| ⋮ | ⋮ |
| MediaFile3Version1 | 1 |
| MediaFile3Version2 | 2 |
| MediaFile3Version3 | 3 |
| ⋮ | ⋮ |

FIG. 5

| Media File ID (405) | Address Pointer (410) | Number of Licenses (415) | Number of Devices Stored On (420) | Stored Device Identifiers (425) |
|---|---|---|---|---|
| MediaFile1 | P1 | 3 | 1 | Device3 |
| MediaFile2 | P3 | 1 | 1 | Device2 |
| MediaFile3 | P2 | 4 | 3 | Device1, Device3, Device4 |
| ... | | | | |

FIG. 7

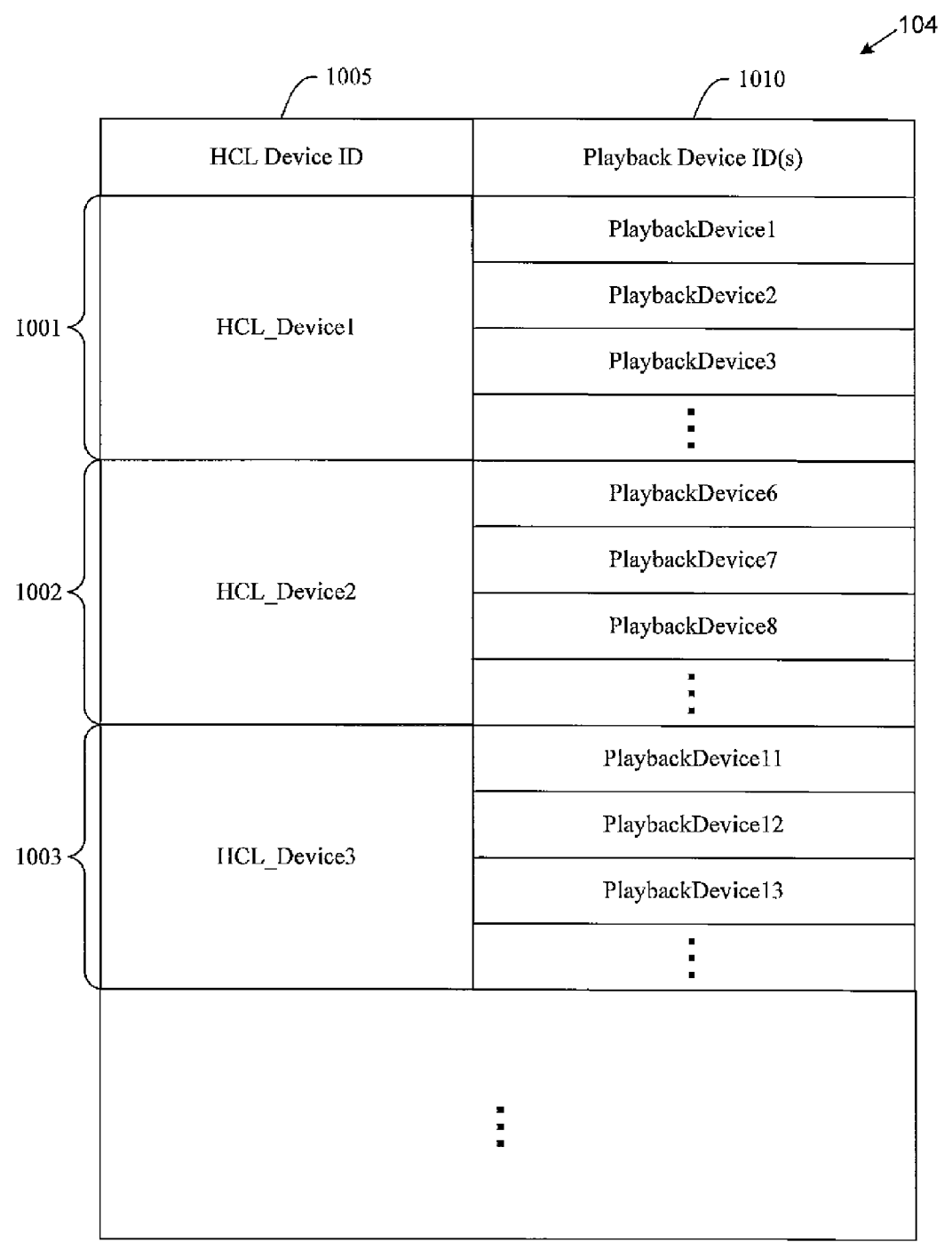

| HCL Device ID | Playback Device ID(s) |
|---|---|
| HCL_Device1 | PlaybackDevice1 |
| | PlaybackDevice2 |
| | PlaybackDevice3 |
| | ⋮ |
| HCL_Device2 | PlaybackDevice6 |
| | PlaybackDevice7 |
| | PlaybackDevice8 |
| | ⋮ |
| HCL_Device3 | PlaybackDevice11 |
| | PlaybackDevice12 |
| | PlaybackDevice13 |
| | ⋮ |
| ⋮ | |

FIG. 10

MANAGING LICENSES OF MEDIA FILES ON PLAYBACK DEVICES

FIELD

The present invention relates to media systems, and, more specifically, to managing licenses of media files on playback devices in a media system.

BACKGROUND

The widespread use of computers, digital media devices, e.g., video, audio, image, picture, and/or gaming media devices, and the Internet has resulted in the generation and use of digital media files. Digital media files may contain binary data that provide various forms of media content (e.g., video, audio, image, or gaming content). Media files are typically stored on a computer storage medium that is accessible by computer devices, such as CD-ROMs, hard drives, memory sticks, etc.

The storage of digital media files on computer mediums allows for easy generation and transfer of digital media files. For example, it has become popular to purchase media files (e.g., video and audio files) on the Internet, and download and store the media files to computers. Also, it has become popular to generate digital photos by using a digital camera and then to transfer and store the digital photos to computers. Computer applications permit the user to manipulate and play back the media files. These types of applications have also contributed to the widespread popularity of digital media files.

The media files may then be played (decoded and presented) on a compatible playback device. A playback device may decode the digital media file to convert the digital data to analog signals (digital-to-analog conversion) and present the analog signals by using presentation components comprising video and/or audio components. For example, a video or gaming media file may be decoded and presented on a playback device having video and audio components (e.g., a display and speakers), an audio media file may be decoded and presented on a playback device having audio components (e.g., speakers or headphones), and an image media file may be decoded and presented on a playback device having a video component.

In addition to computer monitors, a television may be used as a video component (e.g., screen and/or display) for presenting video content and an audio component (e.g., speakers) for presenting audio content of a media file. Televisions may also present television content. Large, high definition televisions are currently popular for home use. With 1080 lines per picture and a screen aspect ratio (width to height ratio) of 16:9 (compared to 525 lines per picture and a 4:3 screen aspect ratio of standard definition television), high definition televisions provide more resolution than standard definition television (SDTV). With the larger displays available today, on televisions as well as computer monitors, modern displays may easily present multiple windows of media.

Also, the widespread use of computers, digital media devices, e.g., video, audio, image, picture, and/or gaming media devices, and the Internet has resulted in the generation and use of digital media files. Digital media files may contain binary data and comprise various types of media files (e.g., video, audio, image, or gaming files). Media files are typically stored on a computer storage medium that is accessible by computer devices, such as CD-ROMs, hard drives, memory sticks, etc.

The storage of digital media files on computer mediums allows for easy generation and transfer of digital media files. For example, it has become popular to purchase media files (e.g., video and audio files) on the Internet, and download and store the media files to computers. The media files may then be played (decoded and presented) on a compatible playback device. A playback device may decode the digital media file to convert the digital data to analog signals (digital-to-analog conversion) and present the analog signals by using presentation components.

However, as the use of digital media files becomes more popular, media file piracy (e.g., illegal copying of media files) has also become of greater concern to media producers, such as companies or individuals that produce movies, music, or other media. A conventional method of attempting to control media piracy has been to prohibit consumers from any copying of protected media files. Generally this method has been met with disapproval as consumers continually demand that purchased media files be shared among their media devices. As such, an improved method of controlling media piracy that satisfies consumer demands while also protecting rights of media producers is needed.

SUMMARY

Methods and apparatus are described herein for managing licenses of media files on playback devices in a media system. In some embodiments, each media file is purchased by a user based on a number of licenses. A media file may be purchased with one or more licenses, each license granting legal permission for a user to store the media file on a single playback device. In these embodiments, different licensing versions of the same media file may be offered for purchase, each version having a different number of associated licenses for the media file. For example, a purchase of a licensing version of a particular music file having 3 licenses allows the user to store the particular music file on a maximum of three playback devices concurrently. As such, each media file may have an associated number of licenses (comprising one or more licenses) that specifies the maximum number of playback devices on which the media file is permitted to be stored at the same time (concurrently).

Various methods may be used to determine the number of licenses associated with a media file. In some embodiments, each media file is embedded with licensing data that specifies the number of licenses purchased and associated with the media file. In other embodiments, each media file is embedded with a version identifier that is mapped to a number of associated licenses using a license mapping data structure. In further embodiments, a version identifier of a media file is determined by producing a content identifier value (e.g., a fingerprint, checksum, or hash value) for the media file representing the data contents of the media file. The version identifier (comprising the content identifier value) being mapped to a number of associated licenses using a license mapping data structure.

In some embodiments, the media system comprises a license tracking service (LTS) server and one or more home systems each coupled to the LTS server through a network, such as the Internet. Each home system may comprise a home central licensing (HCL) device, a primary storage device, and at least one playback device coupled to each other through a local home network. The primary storage device may be used to initially store newly purchased media files in the home system. For example, a media file may be purchased through a download from the Internet or purchased on a physical medium and/or media (e.g., CD, DVD, Blu-ray, etc.) from a store and copied and/or stored to the primary storage device. The HCL device may then manage licenses and distribution of the media files on the primary storage device to playback devices within the home system. Each playback device may be configured for receiving and storing at least one media file, and playing back stored media files.

Each HCL device at each home system may produce and maintain a license manager data structure for storing data needed for managing the licenses and distribution of media files within the home system. The license manager data structure may store data describing media files and playback devices of the home system. In some embodiments, each media file may be represented by a media file entry in the license manager data structure, the media file entry containing multiple fields for storing data describing the media file. For example, a media file entry may contain fields for a media file identifier (e.g., filename), an address pointer to a storage location where the media file is stored on the primary storage device, a number of licenses associated with the media file, a number of playback devices on which the media file is currently stored, and/or playback device identifiers of the playback devices on which the media file is currently stored. The license manager data structure may be stored locally in the home system (e.g., on the HCL device) or stored externally on the LTS server.

For the media files stored on the primary storage device, the HCL device may allow or not allow and/or prohibit distribution of the media files to the playback devices for storage. This determination is made using the license manager data structure. The HCL device may implement a license manager engine that manages licenses and distribution of media files to the playback device. Media files in the home system may be copied to or removed from playback devices by using the license manager engine in response to received user requests. The license manager engine may comprise a user interface for receiving user requests. For example, a received user request may comprise a "distribution request" for copying a particular media file from the primary storage device to a particular playback device for storage on the playback device. This process is referred to as a distribution of the media file to the playback device. As a further example, a received user request may comprise a "removal request" for removing and/or deleting a particular media file from a particular playback device.

Upon receiving a distribution request for a particular media file to a particular playback device, the license manager engine may determine whether to allow or prohibit distribution of the media file to the playback device by locating and examining a media file entry representing the media file in the license manager data structure. The media file entry may specify a first number comprising the number of licenses purchased and associated with the media file and a second number comprising the number of playback devices on which the media file is already currently stored. The license manager engine may determine to allow distribution of the media file to the playback device if the first number is greater than the second number. The license manager engine may then allow transmitting or distributing the media file from the primary storage device to the playback device for storage (e.g., through the local network). The license manager engine may determine to prohibit distribution of the media file to the playback device if the first number is not greater than the second number. The license manager engine may then display an error message indicating there are not sufficient licenses for the media file to be distributed to the playback device, and not allow transmitting and/or distributing the media file from the primary storage device to the playback device for storage.

Upon receiving a removal request for a particular media file from a particular playback device, the license manager engine may remove and/or delete the media file from the playback device (assuming the playback device is currently coupled with the HCL device through the local network). The license manager engine may then update the media file entry representing the media file in the license manager data structure to reflect the current number of playback devices on which the media file is stored. The license manager engine may do so by decrementing the number of playback devices on which the media file is already currently stored.

Each HCL device in a home is coupled with a license tracking service (LTS) server through an external network, such as the Internet. In some embodiments, the LTS server may be used to externally store a license mapping data structure for mapping version identifiers of media files to a number of licenses associated with the version identifiers. In these embodiments, the license manager engine may determine a version identifier of a media file and communicate with the LTS server (through the external network) to examine the license mapping data structure and determine the number of licenses associated with the version identifier. In further embodiments, the LTS server may also be used to externally store the license manager data structure for each HCL device. In these embodiments, the license manager engine may communicate with the LTS server (through the external network) to read data from and write and/or update data to the license manager data structure. The license mapping data structure and license manager data structure may be stored externally to the LTS server to help prevent improper user manipulations or hacking of the licensing information of the media files.

In some embodiments, the LTS server also performs, via the external network, a registration process and a disassociation process for the HCL devices and playback devices of the home systems. In the registration process, each HCL device and playback device is registered with the LTS server by using a unique identifier. Each HCL device and playback device may have a unique identifier that uniquely identifies the HCL device or playback device from all other HCL devices or playback devices used worldwide. For example, the unique identifier may comprise a Media Access Control address (MAC address) of the HCL device or the playback device.

After a HCL device is registered with the LTS server, one or more playback devices may be registered and associated with the HCL device. In some embodiments, the LTS server only allows a single playback device to be concurrently registered and associated with a single HCL device worldwide (referred to as a "one-to-one association"). Permitting a playback device to be associated with only a single HCL device at any given time further provides piracy protections as it helps ensure that media files of playback players are not shared and/or distributed between different HCL devices of different home systems.

In some embodiments, the LTS server may store and maintain a device registration data structure for storing registration information regarding HCL devices and playback devices. The device registration data structure may comprise a plurality of HCL device entries, each HCL device entry representing an HCL device, and each HCL device entry containing multiple fields for storing data describing the HCL device. For example, a HCL device entry may contain fields for a HCL device identifier that uniquely identifies the HCL device (e.g., MAC address) and a playback device identifier (e.g., MAC address) that uniquely identifies each playback device currently associated with the HCL device.

In some embodiments, after a playback device is registered and/or associated with a particular HCL device, the playback device may be later un-registered and/or disassociated from the particular HCL device. In some of these cases the same playback device may then be registered and/or associated with a new HCL device. In these embodiments, the playback device may be un-registered and/or disassociated from a HCL device only if there are no media files currently stored on the playback device.

The embodiments described herein may provide an improved method for reducing media file piracy (e.g., illegal copying of media files) that is of concern to media producers. In these embodiments, media producers may put a limit on the number of playback devices on which a media file may be stored simultaneously based on the number of licenses purchased by the user for the media file. The media producer may charge different prices for the different licensing versions of the media file that each provide a different number of licenses. The embodiments described herein may also provide consumers the ability to legally distribute and/or share purchased media files among their various playback devices.

BRIEF DESCRIPTION OF THE DRAWINGS

FIG. 1A is a block diagram of an exemplary media system environment in which some embodiments operate;

FIG. 4 shows an exemplary license manager data structure;

FIG. 5 shows an exemplary license mapping data structure;

FIG. 7 shows an exemplary license manager data structure having exemplary data;

FIG. 10 shows an exemplary device registration data structure.

DETAILED DESCRIPTION

Figure 1B:
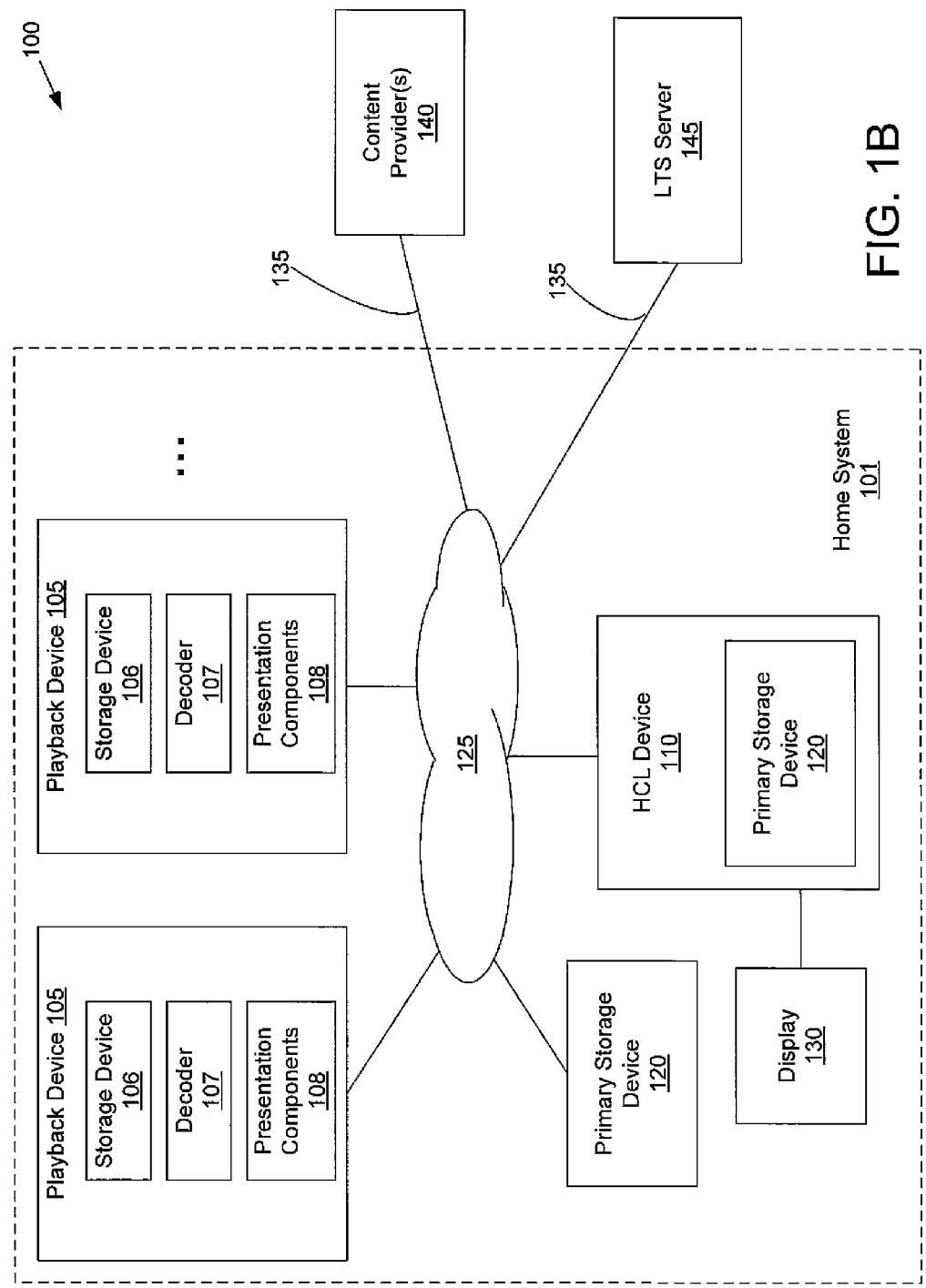
FIG. 1B is a block diagram of an exemplary media system environment showing components of a home system.

In the following description, numerous details are set forth for purpose of explanation. However, one of ordinary skill in the art will realize that the embodiments described herein may be practiced without the use of these specific details. In other instances, well-known structures and devices are shown in block diagram form in order to not obscure the description with unnecessary detail.

The description that follows is divided into three sections. Section I describes a media system environment for managing media licenses in which some embodiments operate. Section II describes managing licenses and distribution of media files in a home system. Section III describes a registration process of a HCL device and playback devices with an LTS server.

I. Media System Environment for Managing Media Licenses

A. Media System

FIG. 1A is a block diagram of an exemplary media system environment 100 in which some embodiments operate. As shown in FIG. 1A, the media system 100 comprises a license tracking service (LTS) server 145 and a plurality of home systems 101, 111, and 112 coupled to the LTS server 145 through a network 135. The embodiments herein may be described in relation to the home system 101. In some embodiments, the description of the example home system 101 may also pertain to the other home systems 111 and 112 as well.

The LTS server 145 may store data structures 102, 103, and 104 for managing licenses, distributing media files, and registering devices within the home systems 101. In some embodiments, the LTS server 145 may store a separate license managing data structure 102 for each home system 101 for managing licenses and distributing media files within the respective home system 101. In some embodiments, the LTS server 145 may store a license mapping data structure 103 for the plurality of home systems 101 for mapping version identifiers of media files to a number of licenses associated with the version identifiers. In some embodiments, the LTS server 145 may store a device registration data structure 104 for the plurality of home systems 101 for registering HCL and playback devices within the plurality of home systems 101. In other embodiments, any or all of the data structures 102, 103, and/or 104 may be stored elsewhere, for example, within the home systems 101. For example, in some embodiments, each home system 101 may store its own license managing data structure 102 for managing licenses and distributing media files within its home system 101.

Each home system 101 may be coupled to the LTS server 145 through an external network 135. The external network 135 may be implemented by using, for example, a wired or wireless network, a wide area network (WAN), a virtual private network (VPN) implemented over a public network such as the Internet, etc., and/or by using radio frequency (RF), infrared (IR), Bluetooth, etc. Each home system 101 may also be coupled to media content providers 140. The media content providers 140 may provide media files, for example, for purchasing and/or delivery to the home system 101.

B. Home System

FIG. 1B is a block diagram of an exemplary media system environment 100 showing components of a home system 101. As shown in FIG. 1B, the example home system 101 may comprise a home central licensing (HCL) device 110, a primary storage device 120, and at least one playback device 105 coupled to each other through a local home network 125.

The HCL device 110 may comprise hardware and/or software components configured for managing licenses, distributing media files, and registering devices within the home system 101. The HCL device 110 may do so by implementing a license manager engine. The license manager engine may comprise a user interface for interacting with the HCL device 110 and for receiving user requests, in accordance with embodiments described herein. The user interface of the license manager engine may be displayed on a display 130 coupled with the HCL device 110. The display 130 may comprise, for example, a television or computer monitor. The details of the HCL device 110 are discussed below in relation to FIG. 2.

C. Primary Storage Device

A primary storage device 120 may comprise hardware and/or software components configured for storing media files. The primary storage device 120 may comprise one or more writable media storage devices, such as disk drives, video tape, magnetic tape, optical devices, CD, DVD, Blu-ray, flash memory, Magnetic Random Access Memory (MRAM), Phase Change RAM (PRAM), a solid state storage device, or another similar device adapted to store data. A primary storage device 120 may implement a file system to provide directories containing filenames for media files.

In some embodiments, the primary storage device 120 and the HCL device 110 may comprise a single integrated device, e.g., computer system, that is coupled to the network 125. In other embodiments, a primary storage device 120 and the HCL device 110 may comprise separate devices each coupled to the network 125 separately. In these embodiments, the primary storage device 120 may comprise a dedicated standalone storage device, such as a network-attached storage (NAS) or Storage Area Network (SAN) device.

The primary storage device 120 may be used to initially store newly purchased media files in the home system 101. In some embodiments, the primary storage device 120 is used to first store newly purchased media files in the home system 101, whereby the HCL device 110 may process and analyze the media files from the primary storage device 120 in accordance with embodiments described herein. The HCL device 110 may then manage licenses and distribution of the media files on the primary storage device 120 to playback devices 105 within the home system 101. The primary storage device 120 may store a plurality of digital media files of various types. In some embodiments, a primary storage device 120 may store a plurality of video, audio, image, and/or gaming media files. In other embodiments, a primary storage device 120 may store media files of other types.

The media files stored on the primary storage device 120 may originate from various sources. For example, the HCL device 110 may be coupled to content providers 140 and, responsive to received user requests, access such content providers 140 for purchasing and downloading media files that are then stored to the primary storage device 120. The HCL device 110 may be coupled to the content providers 140 through an external network 135. As another example, media files may be purchased on a physical medium and/or media (e.g., CD, DVD, Blu-ray, etc.) from a store and then copied and/or stored to the primary storage device 120. In other embodiments, the media files stored on the primary storage device 120 may originate from other sources.

D. Playback Device

In some embodiments, each playback device may be configured for receiving and storing at least one media file, and playing back stored media files. Each playback device 105 may comprise a playback storage device 106, a decoder 107, and presentation components 108. The playback storage device 106 may store media files distributed and/or loaded from the primary storage device 120 by the HCL device 110. The playback storage device 106 may comprise a device similar to the primary storage device 120 and may be similarly configured for storing digital media files for example, a disk drive, flash memory, etc. The playback device storage device 106 typically comprises a significantly smaller amount of storage space than the primary storage device 120.

The playback device 105 also may comprise a decoder engine 107 and presentation components 108 for playing back (presenting) media content of the stored media files. The decoder engine 107 may be configured for decoding the encoded digital media files stored on the playback storage device 106. The decoder 107 may be configured for converting the encoded digital data of the media files to analog signals, e.g., digital-to-analog conversion, and pass the analog signals to presentation components 108. Alternatively, the presentation components receive and process digital signals directly by using an interface such as DVI, HDMI, and the like.

The presentation components 108 may include for example, video and/or audio components, that are configured for receiving and presenting the signals representing the media content, e.g., video and/or audio content, stored on the media files. For example, the presentation components 180 may include a display (such as a television or monitor), speakers, headphones, and/or output components for outputting video and/or audio to the display or to the speakers or headphones. A variety of displays and/or televisions are contemplated including, for example, a liquid crystal display "LCD", a light emitting diode (LED), a cathode ray tube (CRT), and/or a plasma type television, monitor and/or display. For example, a video or gaming media file may be decoded and presented on a playback device having video and audio components (e.g., a display and speakers or headphones), an audio media file may be decoded and presented on a playback device having audio components (e.g., speakers or headphones), an image media file may be decoded and presented on a playback device having a video component, etc.

In some embodiments, the playback device 105 may comprise a portable mobile device whereby the storage, decoding, and presentation components are integrated within a single portable device. Examples of portable mobile playback devices include computer laptops, cell phones, smartphones, BlackBerrys, personal digital assistants (PDAs), convergent devices, portable video players, portable music players (e.g., MP3 players), portable video game players, car media players, playback devices installed in cars, etc. In other embodiments, a portable device comprises other such devices. Note that typically, if the playback device 105 is a portable audio device, the presentation component 108 of the playback device 105 may comprise only an audio output component that outputs analog audio to a set of external headphones.

In other embodiments, the playback device 105 may comprise a non-portable device whereby the storage, decoding, and/or presentation components are contained within two or more separate devices, that collectively comprise the playback device 105. For example, a first device may contain the storage and decoding components 106 and 107, the first device being coupled with a second device that includes the presentation components 108, the first and second devices collectively comprising the playback device 105. Examples of the first device include a digital video recorder (DVR), a CD or DVD player with a hard drive, etc. Examples of the second device include a television such as for presenting videos, images, and games, a stereo receiver and/or amplifier for presenting audio, etc. In other embodiments, the first and second devices comprise other such devices.

F. Network

The network 125 may comprise a wired, direct connect, and/or wireless system. The network 125 may be implemented by using, for example, a wired or wireless network, a personal area network (PAN), a local area network (LAN), a wide area network (WAN), a virtual private network (VPN) implemented over a public network such as the Internet, etc., and/or by using radio frequency (RF), infrared (IR), Bluetooth, etc. In other embodiments, the network 125 may be implemented by using other means. For example, the network 125 may comprise a network implemented in accordance with standards, such as Ethernet 10/100/1000 over Category 5 or 6, HPNA, Home Plug, IEEE 802.x, IEEE 1394, USB 1.1, 2.0, etc.

Some embodiments described herein may be implemented through use of the networks 125 and 135. In particular, embodiments requiring communications and/or interactions between components of the media system 100 including, for example, the LTS server 145, the HCL device 110, the primary storage device 120, and the playback device(s) 105 may be implemented through the networks 125 and 135. For example, media files on the primary storage device 120 may be examined and loaded to playback devices by the HCL device 110 and media files on a playback device may be deleted by the HCL device 110 through use of the local network 125. As a further example, an HCL or playback device may be registered with the LTS server through the external network 135.

G. HCL Device

Figure 2:
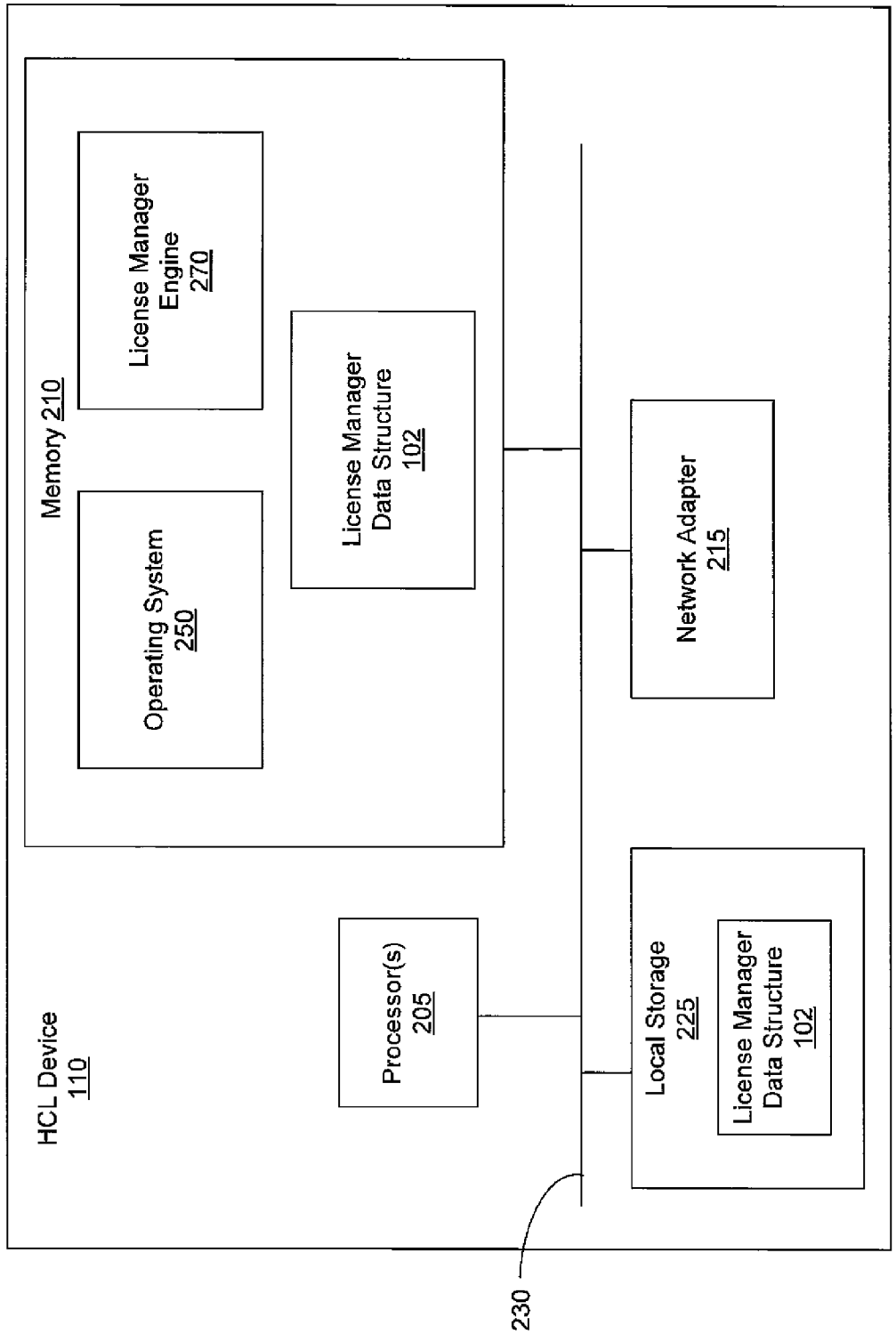
FIG. 2 is a diagram illustrating various components of a HCL device, in accordance with some embodiments.

FIG. 2 is a diagram illustrating various hardware and software components of the HCL device 110, in accordance with some embodiments. The HCL device 110 may comprise a computer device comprising processor(s) 205, memory 210, a network adapter 215, and a storage component 225 coupled by a bus 230.

The processors 205 are the central processing units (CPUs) of the HCL device 110. The processors 205 may include programmable general-purpose or special-purpose microprocessors, digital signal processors (DSPs), programmable controllers, application specific integrated circuits (ASICs), programmable logic devices (PLDs), or the like, or a combination of such devices. A network adapter 215 may comprise mechanical, electrical and signaling circuitry needed to couple the HCL device 110 to the networks 125 and 135 and to receive and transmit data over the networks 125 and 135. For example, the network adapter 215 may comprise a network port controller, e.g., Ethernet cards, for receiving and transmitting data over a network. A network adapter 215 may be used to couple the HCL device 110 to a primary storage device 120, a playback device 105, LTS server 145, and content providers 140 through the networks 125 and 135.

The storage component 225 may comprise a non-volatile storage device that stores information within the HCL device 110. The HCL device 110 loads information stored on the storage component 225 into a memory 210 from which the information is accessed by the processors 205. In some embodiments, the license manager data structure 102 is stored on a storage component 225 that is non-volatile. In other embodiments, the license manager data structure 102 is stored on the LTS server. In some embodiments, the storage component 225 may also initially store media files and therefore comprise or function as a primary storage device 120.

The memory 210 comprises storage locations that are addressable by the processor 205 for storing software program code. The processor 205 and adapters may, in turn, comprise processing elements and/or logic circuitry configured to execute the software code. For example, the memory 210 may be a random access memory (RAM), a read-only memory (ROM), or the like.

In some embodiments, the memory 210 stores instructions and/or data for an operating system 250, a license manager engine 270, and a license manager data structure 102. The license manager engine 270 may manage licenses and distribute media files within the home system 101 by using the license manager data structure 102. The license manager engine 270 may comprise a user interface application for interacting with the HCL device 110 and for receiving user requests, in accordance with embodiments described herein. The user interface of the license manager engine may be displayed on a display 130 coupled with the HCL device 110.

In some embodiments, the HCL device 110 comprises a device having full-time or scheduled access to the Internet (through network 135) for allowing communication with the LTS server 145 whenever required. In some embodiments, the LTS server 145 also comprises a computer having the same or similar hardware components as the HCL device 110, as described in relation to FIG. 2. For example, the LTS server 145 may also comprise a computer comprising a processor(s) 205, memory 210, a network adapter 215, and a storage component 225 coupled by a bus 230. The storage component 225 of the LTS server may store data structures 102, 103, and 104 for managing licenses, distributing media files, and registering devices within the home systems 101.

II. Managing Licenses and Distribution of Media Files in a Home System

A. Producing the License Manager Data Structure

Figure 3:
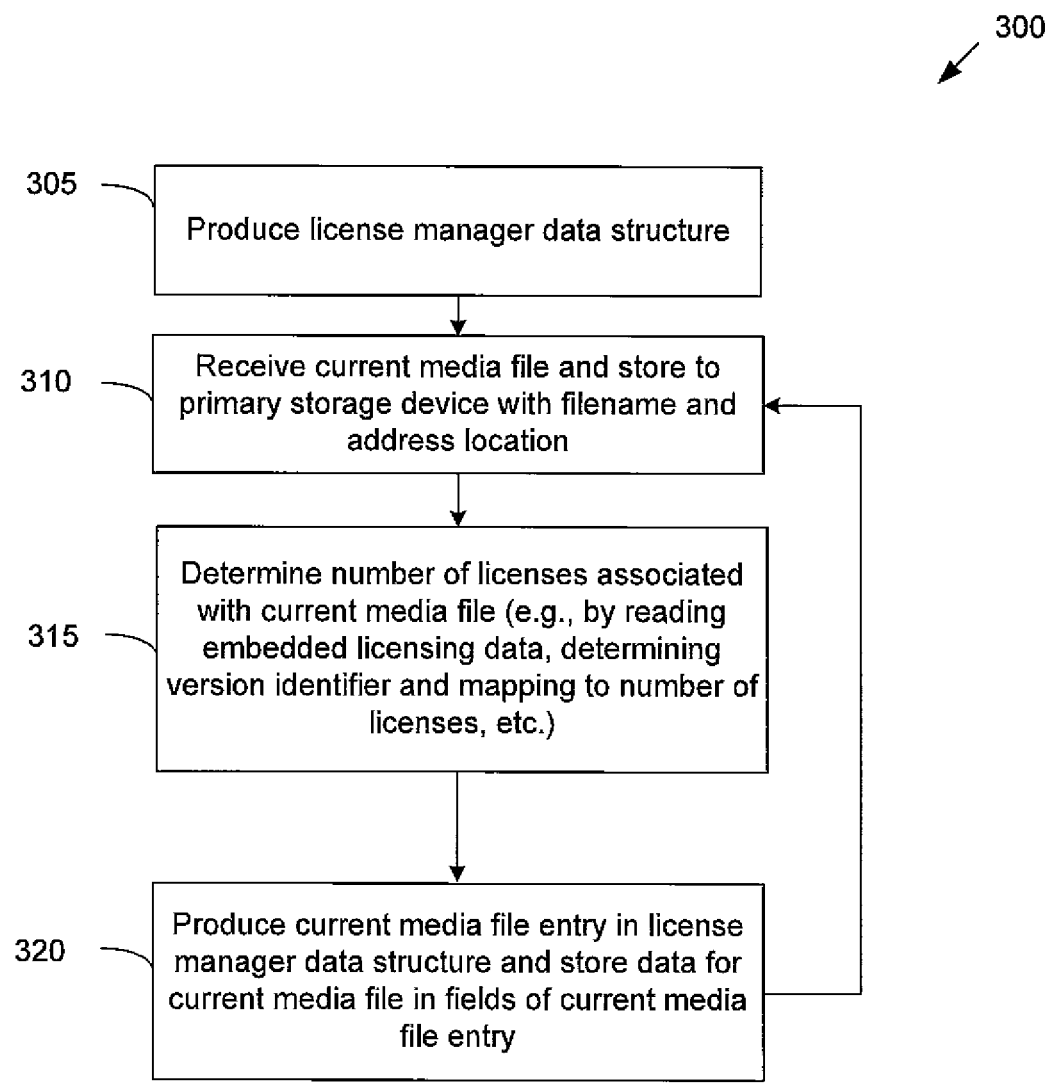
FIG. 3 is a flowchart for a method for producing the license manager data structure.

FIG. 3 is a flowchart for a method 300 for producing the license manager data structure 102. The method 300 of FIG. 3 is described in relation to FIG. 4 which shows an exemplary license manager data structure 102 and FIG. 5 which shows an exemplary license mapping data structure 103. In some embodiments, some of the steps of the method 300 may be performed automatically, without requiring user or human initiation, interaction, or intervention. The order and number of steps of the method 300 are for illustrative purposes only and, in other embodiments, a different order and/or number of steps are used. In some embodiments, some of the steps of the method 300 may be performed by the license manager engine 270 implemented on the HCL device 110. To perform the steps of the method 300, the license manager engine 270 may communicate and interact with the primary storage device 120 or playback devices 105 through the local network 125 or the LTS server 145 or media content providers 140 through the external network 135.

As shown in FIG. 3, the method 300 begins by producing (at a step 305) the license manager data structure 102. The license manager data structure 102 may be stored locally in the home system 101 (e.g., on the HCL device 110) or stored externally on the LTS server 145. When filled with data describing media files, the license manager data structure 102 contains a plurality of media file entries. FIG. 4 shows an exemplary license manager data structure 102. As shown in FIG. 4, the license manager data structure 102 comprises a plurality of media file entries 401, 402, and 403, each media file entry representing a media file. Each media file entry 401 comprises a plurality of data fields for storing data describing the media file. In some embodiments, a media file entry 401 may contain fields for a media file identifier 405 (e.g., filename), an address pointer 410 (to a storage location where the media file is stored on the primary storage device), a number of licenses 415 (associated with the media file), a number of playback devices 420 (on which the media file is currently stored), and/or playback device identifier(s) 425 of the playback device(s) on which the media file is currently stored.

The method 300 then receives (at a step 310) a current media file in the home system 101 and stores the current media file to the primary storage device 120. The current media file may be stored with a filename at a storage address on the primary storage device 120. The current media file may originate from various sources. For example, the current media file may be purchased and stored and/or downloaded from a content provider 140 to the primary storage device 120 or purchased on a physical medium and/or media (e.g., CD, DVD, Blu-ray, etc.) and then copied and/or stored to the primary storage device 120.

The method 300 then determines (at a step 315) a number of licenses associated with the current media file. Various methods may be used to determine the number of licenses associated with the current media file. In some embodiments, the current media file is embedded with licensing data that specifies the number of licenses purchased and associated with the media file. In these embodiments, the method 300 may read the embedded licensing data to determine the number of associated licenses. In other embodiments, each media file is embedded with a version identifier that is mapped to a number of licenses by using a license mapping data structure 103. The license mapping data structure 103 may be stored locally in the home system 101 (e.g., on the HCL device) or stored externally on the LTS server 145.

In further embodiments, a version identifier of a media file is determined by producing a content identifier value for the media file representing the data contents of the media file. The version identifier (comprising the content identifier value) then being mapped to a number of associated licenses by using the license mapping data structure 103. For example, the content identifier value of a media file may be determined using a fingerprint, checksum, or hash operations (such as Message Digest 5, SHA, etc.) that produces a fingerprint, checksum, or hash value (comprising the content identifier value) that represents the data contents of the media file. Regardless of the particular content identifier operation used to produce the content identifier value, typically the content identifier operation is configured such that when two media files have the same content identifier value, there is a high probability that the two media files have the same data content as well.

FIG. 5 shows an exemplary license mapping data structure 103. As shown in FIG. 5, the license mapping data structure 103 comprises a plurality of media file version entries, each media file version entry representing a licensing version of a media file. Each media file version entry may comprise a data field for a media file version identifier 505 and a data field for a number of licenses 510 associated with the version identifier 505. Note that the license mapping data structure 103 may contain a set 501 of media file version entries for each different media file. For example, MediaFile1 may have a plurality of different licensing versions, each licensing version having a different number of licenses. In some embodiments, the method 300 may determine (at a step 315) a media file version identifier 505 of the current media file and map the media file version identifier 505 to a number of licenses 510 associated with the current media file by using a license mapping data structure 103.

The method 300 then produces (at a step 320) an entry 401 ("current media file entry") in the license manager data structure 102 and stores data for the current media file in data fields of current media file entry. For example, the method 300 may store the current media file filename 405, an address pointer 410, a number of associated licenses 415 (determined at step 315), a number of playback devices 420 on which the media file is currently stored (which is initially set to 0), and/or playback device identifiers 425 of the playback devices on which the media file is currently stored (which is initially set to null values). In some embodiments, the number of playback devices 420 on which the media file is currently stored is initially set to 0 since the storage of the media file to the primary storage device does not count as use of a license (and thus does not count against the number of associated licenses).

The method 300 then continues at step 310 to repeatedly process media files and produce media file entries 401 representing the media files in the license manager data structure 102. FIG. 4 shows exemplary data produced and stored to the media file entries 401 for exemplary media files processed by the method 300.

B. Managing Licenses by Using the License Manager Data Structure

Figure 6:
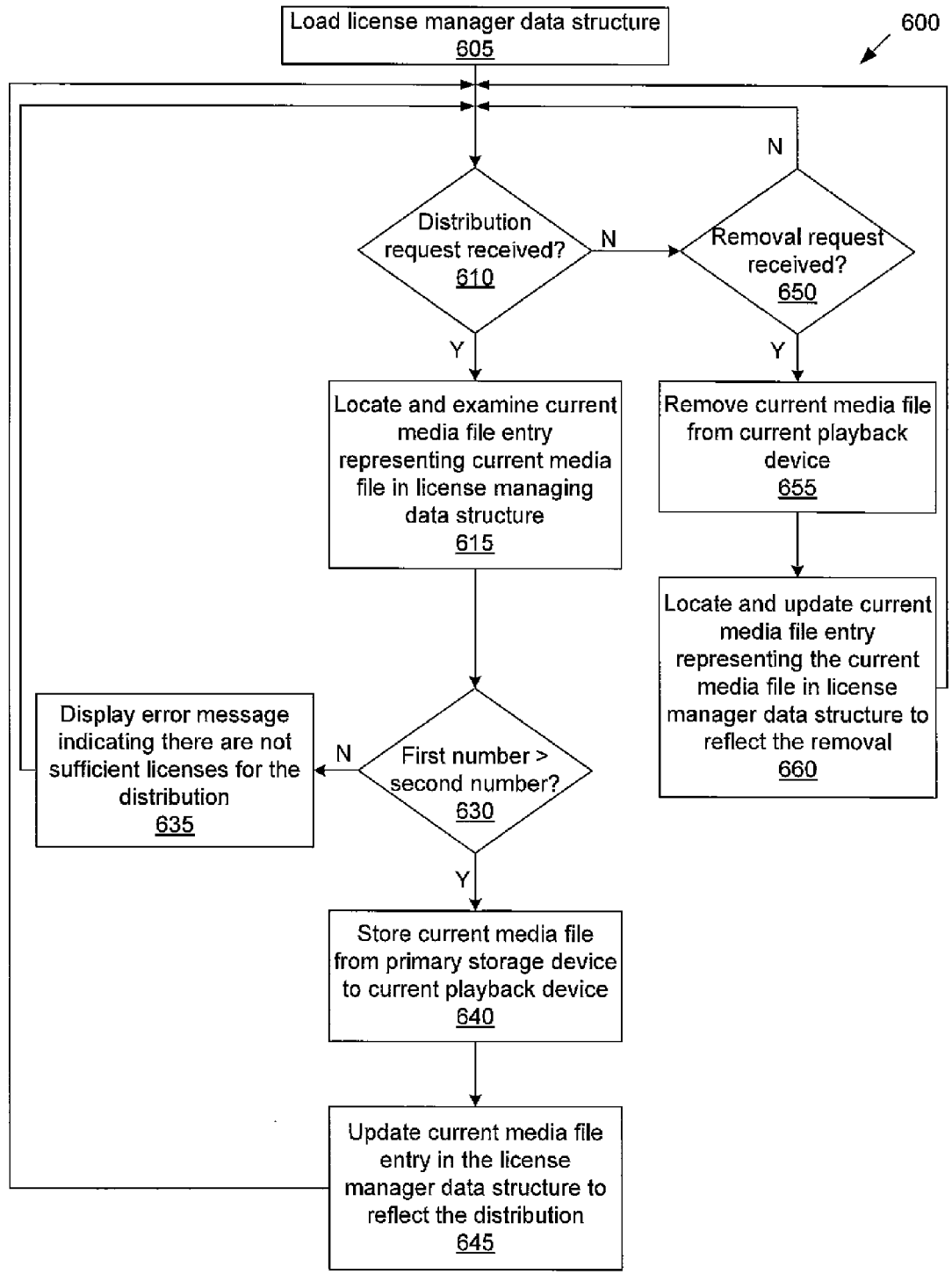
FIG. 6 is a flowchart for a method for managing licenses and distributing media files in a home system.

FIG. 6 is a flowchart for a method 600 for managing licenses and distributing media files in a home system 101. The method 600 of FIG. 6 is described in relation to FIG. 7 which shows an exemplary license manager data structure 102. In some embodiments, some of the steps of the method 600 may be performed automatically, without requiring user or human initiation, interaction, or intervention. The order and number of steps of the method 600 are for illustrative purposes only and, in other embodiments, a different order and/or number of steps are used. In some embodiments, some of the steps of the method 600 may be performed by the license manager engine 270 implemented on the HCL device 110. To perform the steps of the method 600, the license manager engine 270 may communicate and interact with the primary storage device 120 or playback devices 105 through the local network 125 or the LTS server 145 or media content providers 140 through the external network 135. In some embodiments, the methods 300 of FIG. 3 and 600 of FIG. 6 may be performed independently and simultaneously.

As shown in FIG. 6, the method 600 begins by loading (at a step 605) the license manager data structure 102 into memory 210. The license manager data structure may be loaded locally from the home system 101 or externally from the LTS server 145. The method 600 then determines (at a step 610) if a distribution request has been received for loading a current media file from the primary storage device to a current playback device for storage on the playback device. For example, the distribution request may be received from a user through a user interface of the license manager engine 270.

If so, the method 600 locates and examines (at step 615) data fields of a current media file entry 401 representing the current media file in the license manager data structure 102 (e.g., by finding the media file entry 401 having the same filename field 405 as the current media file). Using the data of the current media file entry 401, the method 600 then determines (at a step 630) a first number 415 comprising the number of licenses associated with the media file and a second number 420 comprising the number of playback devices on which the media file is already currently stored, and determines if the first number is greater than the second number.

If not, this indicates that the maximum number of playback devices that the current media file may be stored (as allowed by the number of purchased licenses) has been reached and the current media file may not be distributed and/or stored to any further devices. As such, if the first number is not greater than the second number, the method 600 displays (at step 635) an error message (e.g., displayed through the user interface) indicating there are not sufficient licenses for the current media file to be distributed to the playback device, and does not allow storing of the current media file from the primary storage device to the current playback device. The method then continues at step 610.

If the first number is greater than the second number, this indicates that the maximum number of playback devices that the current media file may be stored (as allowed by the number of purchased licenses) has not been reached and the current media file may be distributed and/or stored to further devices. As such, if the first number is greater than the second number, the method 600 stores and/or copies (at step 640) the current media file from the primary storage device to the current playback device (assuming the current playback device is currently coupled with the HCL device through the local network).

The method updates (at step 645) the current media file entry 401 of FIG. 4 in the license manager data structure to reflect the distribution of the current media file to the current playback device. The method 600 may do so by incrementing the number 420 of playback devices on which the media file is currently stored. The method may also add the identifier (e.g., MAC address) of the current playback device to the playback device identifier(s) 425 in the current media file entry 401. The method then continues at step 610.

If the method 600 determines (at step 610, "No") that a distribution request is not received, the method 600 determines (at step 650) if a removal request for removing and/or deleting a current media file from a current playback device is received. For example, the removal request may be received from a user through a user interface of the license manager engine 270. If not, the method continues at step 610. If so, the method 600 removes and/or deletes (at step 655) the current media file from the current playback device (assuming the current playback device is currently coupled with the HCL device through the local network).

The method 600 then locates and updates (at step 660) a current media file entry 401 representing the current media file in the license manager data structure to reflect the removal of the current media file. The method 600 may do so by decrementing the number 420 of playback devices on which the current media file is currently stored. The method may also remove the identifier (e.g., MAC address) of the current playback device from the playback device identifier(s) 425 in the current media file entry 401. The method then continues at step 610.

FIG. 7 shows an exemplary license manager data structure 102 having exemplary data for illustrating steps of the method 600. For example, the method 600 may receive (at step 610, "Yes") a distribution request for loading MediaFile1 from the primary storage device to a current playback device. If a distribution request is received at the step 610, the media file entry 401 representing MediaFile1 in the license managing data structure 102 is located and specifies that a first number 415 comprising the number of associated licenses equals "3" and a second number 420 comprising the number of playback devices on which the media file is already currently stored equals "1" in the example of FIG. 7. Thus the method determines that the first number is greater than the second number and the MediaFile1 may be stored to the current playback device. The method would then update the MediaFile1 entry 401 in the license manager data structure by incrementing the number 420 of playback devices on which the media file is currently stored and add the identifier of the current playback device to the playback device identifier(s) 425 in the MediaFile1 entry 401.

As another example, the method 600 may receive (at step 610, "Yes") a distribution request for loading MediaFile2 from the primary storage device to a current playback device. The media file entry 401 representing MediaFile2 in the license manager data structure 102 is located and specifies that a first number 415 comprising the number of associated licenses equals 1 and a second number 420 comprising the number of playback devices on which the media file is already currently stored equals "1." Thus, the method 600 determines that the first number is not greater than the second number and the MediaFile2 may not be stored to the current playback device. The method 600 may display an error message that there are not sufficient licenses for MediaFile2 to be distributed to the playback device, and does not allow storing of MediaFile2 to the current playback device.

As a further example, the method 600 may receive (at step 650, "Yes") a removal request for removing MediaFile3 from a current playback device. The method 600 deletes MediaFile3 from the current playback device and then locates and updates a media file entry 401 representing MediaFile3 in the license manager data structure 102. The method may do so by decrementing (e.g., from 3 to 2) the number 420 of playback devices on which MediaFile3 is currently stored and remove the identifier of the current playback device from the playback device identifier(s) 425 in the media file entry 401.

III. Registration Process with the LTS Server

In some embodiments, the LTS server 145 also performs, via the external network 135, a registration process and a disassociation process for the HCL devices and playback devices of the home systems 101. In the registration process, each HCL device 110 and playback device 105 is registered with the LTS server 145 by using a unique identifier. Each HCL device 110 and playback device 105 may have a unique identifier that uniquely identifies the HCL device 110 or the playback device 105 from all other HCL devices or playback devices used worldwide. For example, the unique identifier may comprise a Media Access Control address (MAC address) of the HCL device or the playback device.

After a HCL device is registered with the LTS server, one or more playback devices may be registered and associated with the HCL device. In some embodiments, the LTS server only allows a single playback device to be concurrently registered and associated with a single HCL device worldwide (referred to as a "one-to-one association"). Permitting a playback device to be associated with only a single HCL device at any given time further provides piracy protections as it helps ensure that media files of playback players are not shared and/or distributed between different HCL devices of different home systems.

In some embodiments, after a playback device is registered and/or associated with a particular HCL device, the playback device may be later un-registered and/or disassociated from the particular HCL device, so that it may be registered and/or associated with a new HCL device. In some of these embodiments, the playback device may be disassociated with a HCL device only if there are no media files currently stored on the playback device.

Figure 8:
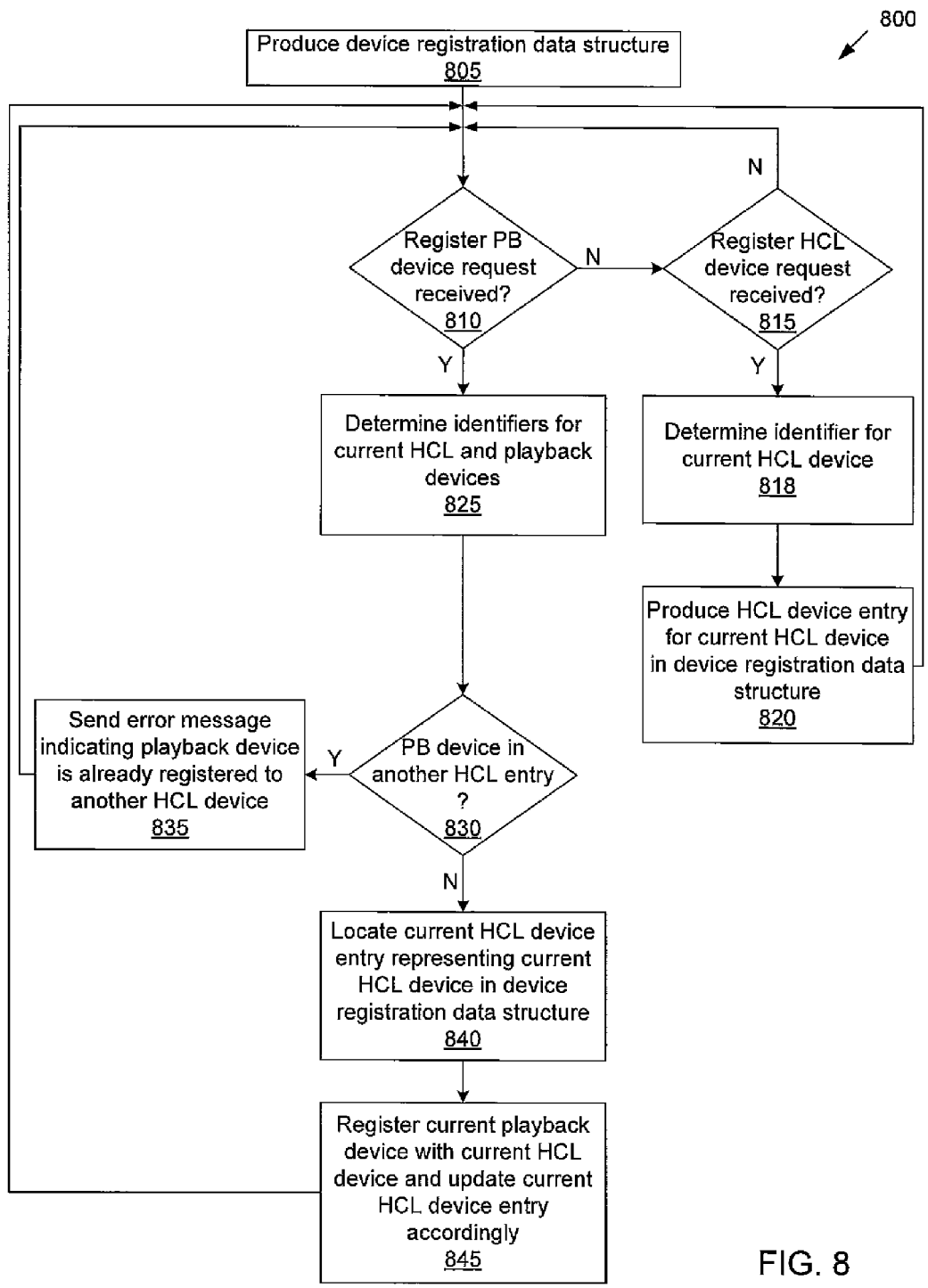
FIG. 8 is a flowchart for a method for registering HCL devices and playback devices.

FIG. 8 is a flowchart for a method 800 for registering HCL devices and playback devices with the LTS server. The method 800 of FIG. 8 is described in relation to FIG. 10 which shows an exemplary device registration data structure 104. In some embodiments, some of the steps of the method 800 may be performed automatically, without requiring user or human initiation, interaction, or intervention. The order and number of steps of the method 800 are for illustrative purposes only and, in other embodiments, a different order and/or number of steps are used. In some embodiments, some of the steps of the method 800 may be performed by the LTS server 145.

The method 800 begins by the LTS server 145 producing (at a step 805) a device registration data structure 104 and storing to a storage component. In some embodiments, the LTS server may store and maintain a device registration data structure 104 for storing registration information regarding HCL devices and playback devices.

FIG. 10 shows an exemplary device registration data structure 104. As shown in FIG. 10, the device registration data structure 104 comprises a plurality of HCL device entries 1001, 1002, and 1003 . . . , each HCL device entry representing a HCL device. The embodiments herein may be described in relation to the HCL device entry 1001. In some embodiments, the description of the HCL device entry 1001 may also pertain to the other HCL device entries 1002 and 1003 . . . , as well. Each HCL device entry 1001 may comprise a plurality of data fields for storing data describing the HCL device. In some embodiments, a HCL device entry 1001 may contain fields for a HCL device identifier 1005 that uniquely identifies the HCL device (e.g., MAC address) and a playback device identifier 1010 (e.g., MAC address) that uniquely identifies each playback device currently associated with the HCL device. The MAC address of a device may comprise a unique identifier assigned to the hardware device by the manufacturer for identification, and used in the Media Access Control protocol layer. If assigned by the manufacturer, a MAC address may encode the manufacturer's registered identification number. The MAC address may also be known as an Ethernet Hardware Address (EHA), hardware address, adapter address, or physical address.

The method 800 then determines (at a step 810) if a request for registering a current playback device for a current HCL device 110 has been received from a HCL device 110 of a home system 101. If not, the method 800 determines (at a step 815) if a request for registering a current HCL device 110 has been received from a HCL device 110 of a home system 101. If not, the method 800 continues at step 810. If so, the method 800 determines (at step 818) the unique identifier (e.g., MAC address) of the current HCL device 110 to be registered. The method then produces (at step 820) a current HCL device entry 1001 for the current HCL device in the device registration data structure 104 and stores the HCL device identifier 1005 to the current HCL device entry 1001. The method 800 then continues at step 810.

If the method 800 determines (at step 810, "Yes") that a request for registering a current playback device for a current HCL device 110 has been received from a HCL device 110, the method determines (at step 825) the unique identifiers (e.g., MAC addresses) of the current HCL device 110 and the current playback device to be registered. The method 800 then examines the HCL device entries 1001, 1002, 1003 . . . , of the device registration data structure 104 and determines (at step 830) whether the current playback device 105 is already registered to another HCL device 110 (e.g., by determining whether the identifier of the current playback device 105 is already listed within another HCL device entry 1001, 1002, 1003 . . . ). If so, the method 800 sends to the requesting HCL device 110 an error message indicating that the current playback device is already registered to another HCL device and can not be registered with the current HCL device. In some embodiments, the method 800 only allows a playback device to be concurrently registered and associated with a single HCL device worldwide (referred to as a "one-to-one association").

If not, the method 800 locates (at step 840) a current HCL device entry representing the current HCL device in device registration data structure 104. The method 800 then registers (at step 845) the current playback device with the current HCL device by updating the current HCL device entry by adding the identifier 1010 of the current playback device to the current HCL device entry 1001. The method 800 then continues at step 810.

Figure 9:
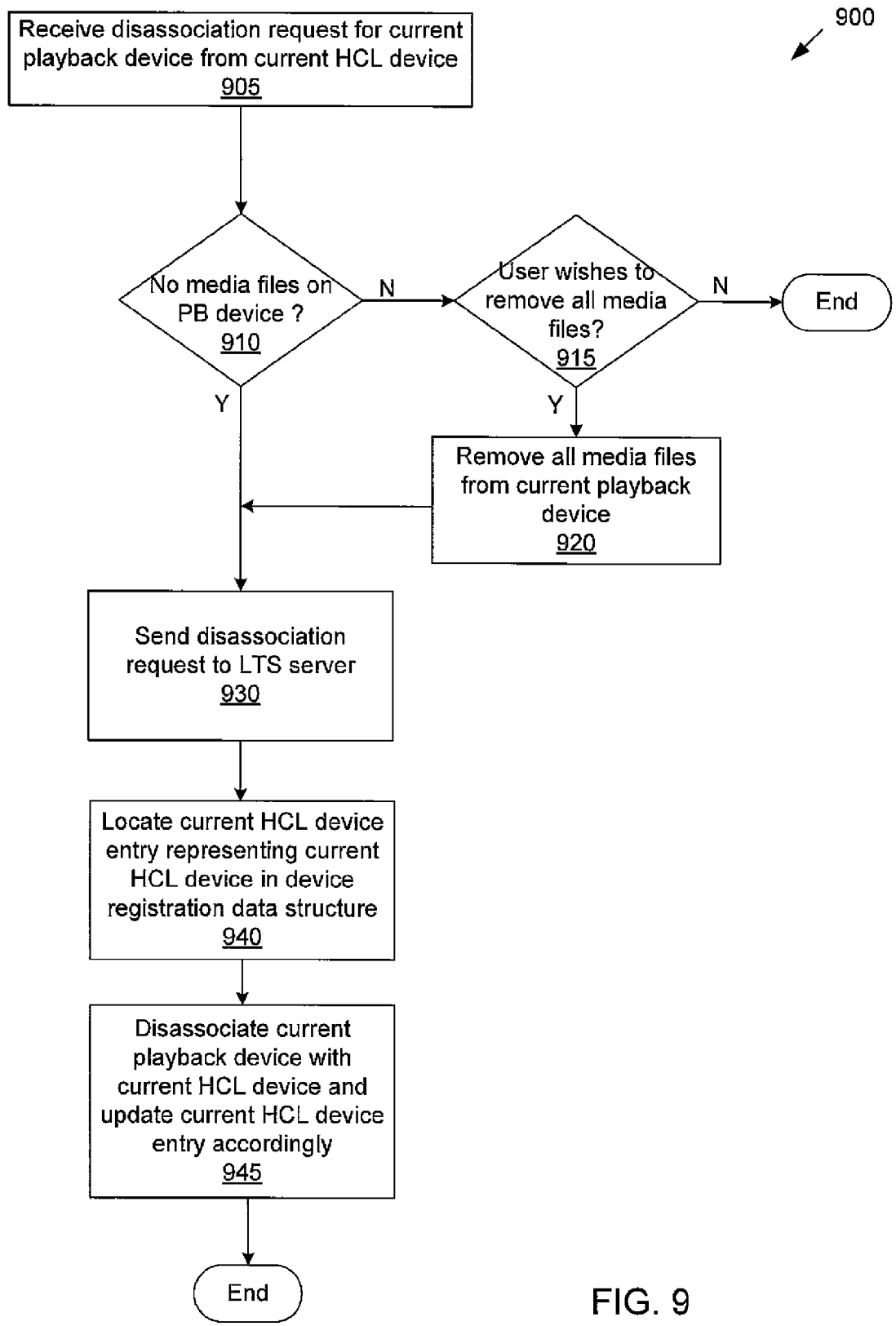
FIG. 9 is a flowchart for a method for disassociating a playback device from a HCL device.

FIG. 9 is a flowchart for a method 900 of disassociating a playback device from a HCL device. The method 900 of FIG. 9 is described in relation to FIG. 10 which shows an exemplary device registration data structure 104. In some embodiments, some of the steps of the method 900 may be performed automatically, without requiring user or human initiation, interaction, or intervention. The order and number of steps of the method 900 are for illustrative purposes only and, in other embodiments, a different order and/or number of steps are used. In some embodiments, some of the steps of the method 800 may be performed by the LTS server 145 and the license manager engine 270 implemented on the HCL device 110 that may communicate through the external network 135. To perform some steps of the method 900, the license manager engine 270 may communicate and interact with playback devices 105 through the local network 125.

The method 900 begins when the HCL device receives (at step 905) an un-registration and/or disassociation request for a current playback device from a current HCL device. For example, the disassociation request may be received from a user through a user interface of the license manager engine 270. The HCL device then determines (at step 910) if there are any media files stored on the current playback (PB) device. If not, the HCL device determines (at a step 915) if the user wishes to remove all media files stored on the current playback device. For example, the user interface of the license manager engine 270 may display a message to remove all media files on the current playback device and then receive user input approving removal of all media files. If not, the method ends. If so, the HCL device removes (at step 920) all media files on the current playback device and continues to step 930. In some embodiments, a playback device may be disassociated with a HCL device only if there are no media files currently stored on the playback device.

If the HCL device determines (at step 910, "Yes") that there are no media files stored on the current playback device, the HCL device sends (at step 930) a disassociation request to the LTS server to disassociate the current playback device from the current HCL device. The LTS server then locates (at step 940) a current HCL device entry representing the current HCL device in device registration data structure 104. The LTS server then disassociates (at step 945) the current playback device from the current HCL device by updating the current HCL device entry by removing the identifier 1010 of the current playback device in the current HCL device entry 1001. The method 900 then ends.

Some embodiments may be conveniently implemented by using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented by using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium and/or media having instructions stored thereon or therein and, when executed for example, by a processor, the instructions perform methods, techniques, or embodiments described herein, the computer readable medium comprising sets of instructions for performing various steps of the methods, techniques, or embodiments described herein. The computer readable medium may comprise a storage medium having instructions stored thereon or therein, which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices including flash cards, magnetic or optical cards, nanosystems including molecular memory ICs, RAID devices, remote data storage, archive and/or warehousing, or any other type of media or device suitable for storing instructions and/or data thereon or therein.

Stored on any one of the computer readable medium and/or media, some embodiments include software instructions for controlling both the hardware of the general purpose or specialized computer or microprocessor, and for enabling the computer or microprocessor to interact with a human user and/or other mechanism by using the results of an embodiment. Such software may include without limitation device drivers, operating systems, and user applications. Ultimately, such computer readable media further includes software instructions for performing embodiments described herein. Included in the programming and/or software of the general-purpose and/or specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software application, module, or layer described herein may comprise an engine comprising firmware or software and hardware configured to perform embodiments described herein. In general, functions of a software application, module, or layer described herein may be embodied directly in hardware, or embodied as software executed by a processor, or embodied as a combination of the two. A software application, module, or layer may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

I claim:

1. A media system for managing distribution of media files based on licenses associated with the media files, the media system comprising:
    a central licensing (CL) device configured for allowing distribution of the media files from a primary storage device to at least one playback device by using a licensing manager data structure that stores, for each media file, a maximum number of playback devices on which the media file is permitted to be stored and a number of playback devices on which the media file is currently stored, wherein:
        each media file is associated with a plurality of different versions, wherein each version corresponds to a different maximum number of playback devices on which the media file is permitted to be stored,
        each media file is embedded with a version identifier that maps the media file to the corresponding one of the plurality of versions stored in the licensing manager data structure to control access to the media file that is stored according to the maximum number of playback devices on which the media file is permitted to be stored and the number of playback devices on which the media file is stored.

2. The media system of claim 1, wherein:
    a license mapping data structure comprises a plurality of media file version entries, each media file version entry comprising a version identifier and a maximum number of playback devices on which a media file corresponding to the media file version entry is permitted to be stored.

3. The media system of claim 1, wherein:
    the CL device is further configured for:
    determining a content identifier based on a hash value of a media file, the content identifier comprising a version identifier of the media file.

4. The media system of claim 1, wherein each license for a media file grants legal permission for a user to store the media file on a single playback device.

5. The media system of claim 1, wherein the CL device is further configured for:
    receiving, from a user, a distribution request for storing a particular media file from the primary storage device to a playback device;
    using the licensing manager data structure to determine a first number representing a maximum number of playback devices on which the media file is permitted to be stored and a second number representing a number of playback devices on which the particular media file is currently stored;
    upon determining that the first number is greater than the second number, storing the particular media file to the playback device and incrementing, in the licensing manager data structure, the number of playback devices on which the particular media file is currently stored; and
    upon determining that the first number is not greater than the second number, not storing the particular media file to the playback device.

6. The media system of claim 1, wherein the CL device is further configured for:
    receiving, from a user, a removal request for deleting a particular media file from a particular playback device;
    deleting the particular media file from the particular playback device; and decrementing, in the licensing manager data structure, the number of playback devices on which the particular media file is currently stored.

7. The media system of claim 1, further comprising:
a license tracking service (LTS) server coupled to the CL device through an external network, the LTS server configured for:
registering a plurality of playback devices with a plurality of CL devices by using a device registration data structure, a playback device being registered with only a single CL device concurrently, the device registration data structure comprising a plurality of CL device entries, each CL device entry representing a CL device and storing a CL device identifier that uniquely identifies the CL device and one or more playback device identifiers that uniquely identifies one or more playback devices currently registered with the CL device; and
upon receiving an un-registration request, un-registering a playback device with a CL device if there are no media files currently stored on the playback device.

8. A method for managing, in a media system, distribution of media files based on licenses associated with the media files, the method comprising:
allowing distribution of the media files from a primary storage device to at least one playback device by using a licensing manager data structure that stores, for each media file, a maximum number of playback devices on which the media file is permitted to be stored and a number of playback devices on which the media file is currently stored, wherein:
each media file is associated with a plurality of different versions, wherein each version corresponds to a different maximum number of playback devices on which the media file is permitted to be stored,
each media file is embedded with a version identifier that maps the media file to the corresponding one of the plurality of versions stored in the licensing manager data structure to control access to the media file that is stored according to the maximum number of playback devices on which the media file is permitted to be stored and the number of playback devices on which the media file is stored.

9. The method of claim 8, wherein:
a license mapping data structure comprises a plurality of media file version entries, each media file version entry comprising a version identifier and a maximum number of playback devices on which a media file corresponding to the media file version entry is permitted to be stored.

10. The method of claim 8, wherein:
determining, using the CL device, a content identifier based on a hash value of a media file, the content identifier comprising a version identifier of the media file.

11. The method of claim 8, wherein each license for a media file grants legal permission for a user to store the media file on a single playback device.

12. The method of claim 8, further comprising:
receiving with the CL device, from a user, a distribution request for storing a particular media file from the primary storage device to a playback device;
using the licensing manager data structure to determine a first number representing a maximum number of playback devices on which the media file is permitted to be stored and a second number representing a number of playback devices on which the particular media file is currently stored;
upon determining that the first number is greater than the second number, storing the particular media file to the playback device and incrementing, in the licensing manager data structure, the number of playback devices on which the particular media file is currently stored; and
upon determining that the first number is not greater than the second number, not storing the particular media file to the playback device.

13. The method of claim 8, further comprising:
receiving, from a user, a removal request for deleting a particular media file from a particular playback device;
deleting the particular media file from the particular playback device; and
decrementing, in the licensing manager data structure, the count of playback devices on which the particular media file is currently stored.

14. The method of claim 8, further comprising:
providing a license tracking service (LTS) server coupled to the CL device through an external network, the LTS server configured for:
registering a plurality of playback devices with a plurality of CL devices by using a device registration data structure, a playback device being registered with only a single CL device concurrently, the device registration data structure comprising a plurality of CL device entries, each CL device entry representing a CL device and storing a CL device identifier that uniquely identifies the CL device and one or more playback device identifiers that uniquely identifies one or more playback devices currently registered with the CL device; and
upon receiving an un-registration request, un-registering a playback device with a CL device if there are no media files currently stored on the playback device.

15. A non-transitory computer readable medium having instructions stored thereon when executed by a processor manage, in a media system, distribution of media files based on licenses associated with the media files, the computer readable medium comprising sets of instructions for:
allowing distribution of the media files from a primary storage device to at least one playback device by using a licensing manager data structure that stores, for each media file, a maximum number of playback devices on which the media file is permitted to be stored and a number of playback devices on which the media file is currently stored, wherein:
each media file is associated with a plurality of different versions, wherein each version corresponds to a different maximum number of playback devices on which the media file is permitted to be stored,
each media file is embedded with a version identifier that maps the media file to the corresponding one of the plurality of versions stored in the licensing manager data structure to control access to the media file that is stored according to the maximum number of playback devices on which the media file is permitted to be stored and the number of playback devices on which the media file is stored.

16. The computer readable medium of claim 15, wherein:
a license mapping data structure comprises a plurality of media file version entries, each media file version entry comprising a version identifier and a maximum number of playback devices on which a media file corresponding to the media file version entry is permitted to be stored.

17. The computer readable medium of claim 15, further comprising sets of instructions for:
determining a content identifier based on a hash value of a media file, the content identifier comprising a version identifier of the media file.

18. The computer readable medium of claim 15, wherein each license for a media file grants legal permission for a user to store the media file on a single playback device.

19. The computer readable medium of claim 15, further comprising sets of instructions for:
- receiving, from a user, a distribution request for storing a particular media file from the primary storage device to a playback device;
- using the licensing manager data structure to determine first number representing a maximum number of playback devices on which the media file is permitted to be stored and a second number representing a number of playback devices on which the particular media file is currently stored;
- upon determining that the first number is greater than the second number, storing the particular media file to the playback device and incrementing the number of playback devices on which the particular media file is currently stored; and
- upon determining that the first number is not greater than the second number, not storing the particular media file to the playback device.

20. The computer readable medium of claim 15, further comprising sets of instructions for:
- receiving, from a user, a removal request for deleting a particular media file from a particular playback device;
- deleting the particular media file from the particular playback device; and
- decrementing, in the licensing manager data structure, the number of playback devices on which the particular media file is currently stored.

* * * * *

UNITED STATES PATENT AND TRADEMARK OFFICE
CERTIFICATE OF CORRECTION

PATENT NO. : 8,631,508 B2
APPLICATION NO. : 12/820812
DATED : January 14, 2014
INVENTOR(S) : Thomas Steven Woods It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this
Thirtieth Day of May, 2017

Michelle K. Lee
*Director of the United States Patent and Trademark Office*